(12) United States Patent
Smolny

(10) Patent No.: US 11,122,035 B2
(45) Date of Patent: Sep. 14, 2021

(54) SECURE DELEGATION OF A REFRESH TOKEN FOR LONG-RUNNING OPERATIONS

(71) Applicant: International Business Machines Corporation, Armonk, NY (US)

(72) Inventor: Martin Smolny, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 279 days.

(21) Appl. No.: 16/288,515

(22) Filed: Feb. 28, 2019

(65) Prior Publication Data

US 2019/0364035 A1  Nov. 28, 2019

(30) Foreign Application Priority Data

May 24, 2018 (EP) .................................... 18174048

(51) Int. Cl.
*H04L 29/06* (2006.01)
(52) U.S. Cl.
CPC .......... *H04L 63/0853* (2013.01); *H04L 63/10* (2013.01)
(58) Field of Classification Search
None
See application file for complete search history.

(56) References Cited

U.S. PATENT DOCUMENTS

| 8,800,009 | B1 | 8/2014 | Beda, III |
| 9,178,868 | B1 | 11/2015 | Leung |
| 9,699,170 | B2 | 7/2017 | Sondhi |
| 9,819,665 | B1 | 11/2017 | Machani |
| 2013/0086645 | A1 | 4/2013 | Srinivasan |
| 2015/0180863 | A1 | 6/2015 | Kobayashi |
| 2016/0014119 | A1 | 1/2016 | Inoue |
| 2016/0099941 | A1* | 4/2016 | Hein ............... H04L 67/125 726/4 |
| 2017/0026376 | A1 | 1/2017 | Matsugashita |
| 2017/0034172 | A1 | 2/2017 | Biggs |

(Continued)

OTHER PUBLICATIONS

International Search Report and Written Opinion from International Application No. PCT/IB2019/054274 dated Oct. 22, 2019, 10 pps.

(Continued)

*Primary Examiner* — Cai Y Chen
(74) *Attorney, Agent, or Firm* — Edward J. Wixted, III

(57) ABSTRACT

A computer-implemented method for a token-based authorization in a data processing environment comprising a user system, an application server and an authorization server may be provided. The method comprises accessing the application via the user agent, sending an access token and a refresh token from the authorization server to the application, triggering an execution of the service providing the long-running operation by the application. The triggering comprises requesting and receiving a transferable refresh token, starting an execution of the service providing the long-running operation by passing the transferable refresh token together with the identifier from the application to the service providing the long-running operation, passing the transferable refresh token from the long-running service to the authorization server, receiving an access and refresh token, and continuing the long running service.

19 Claims, 12 Drawing Sheets

(56) References Cited

U.S. PATENT DOCUMENTS

| | | | |
|---|---|---|---|
| 2017/0048233 A1 | 2/2017 | Khylkouskaya | |
| 2018/0300471 A1* | 10/2018 | Jain | H04W 12/61 |
| 2018/0337784 A1* | 11/2018 | Jain | H04L 9/3213 |

OTHER PUBLICATIONS

Solapukar, "Building Secure Healthcare Services Using OAuth 2.0 and JSON Web Token in IOT Cloud Scenario", 2016, 2nd International Conference on Contemporary Computing and Informatics IC3I), May 4, 2017, pp. 99-104.

"How Does the OAuth Refresh Token Fit Into the Authentication Flow?", REST API Developer Guide, printed from the Internet on Feb. 4, 2019, 5 pps., https://developer.salesforce.com/docs/atlas.en-us.api_rest.meta/api_rest/intro_understanding_refresh_token_oauth.htm.

"OAuth 2.0", printed from Internet on Feb. 4, 2019, 3 pps., https://oauth.net/2/.

"Understanding Refresh Tokens", Auth 0, © 2013-2016 Auth0® Inc., printed from the Internet on Feb. 4, 2019, 7 pps., https://auth0.com/learn/refresh-tokens/.

Hardt, "The OAuth 2.0 Authorization Framework",Internet Engineering Task Force (IETF), https://tools.ietf.org/html/rfc6749, Oct. 2012, 152 pps.

Kubovy, et al., "A Secure Token-Based Communication for Authentication and Authorization Servers", 16 pps., Conference Paper in Lecture Notes in Computer Science, Nov. 2016, http://www.umityalcinalp.com/uploads/3/0/6/3/3063991/devicetoken_website.pdf.

Trammel et al., "Device Token Protocol for Persistent Authentication Shared Across Applications", 16 pps., printed for Internet on Feb. 1, 2019, https://www.researchgate.net/profile/Christian_Huber21/publication/309365153_A_Secure_Token-Based_Communication_for_Authentication_and_Authorization_Servers/links/59b0d68ca6fdcc3f888a0ef0/A-Secure-Token-Based-Communication-for-Authentication-and-Authorization-Servers.pdf.

* cited by examiner

SECURE DELEGATION OF A REFRESH TOKEN FOR LONG-RUNNING OPERATIONS

BACKGROUND OF THE INVENTION

The invention relates generally to a method for an authorization in a data processing environment, and more specifically, to a computer-implemented method for a token-based authorization in a data processing environment.

In times of data privacy, protection of private data, as well as enterprise data solid security, authorization and authentication processes and technologies are key challenges of enterprise information technology. Over the last decades, a plurality of proprietary and open source technologies had been developed to address these challenges. In particular, over the last decade, token-based authentication and authorization systems evolved.

In these systems, an end user authenticates (typically against an authorization server) and gets back a temporary token which proves the authorization of that end-user and optionally also its identity. The temporary token is used (e.g., by web-based user interfaces backend services security, as no credentials flow to those services) token-based systems enable a technology eco-system for services of different vendors which may leverage the same authorization system and procedures. For more complex interactions between services, it may also be possible to pass through the token from the user interface through a service to another down-stream service.

One specific aspect of tokens in the above-mentioned systems is that they typically have only a limited life-time before the token expires. After such a token expiration, the originally requesting client application of the token (e.g., the web-based user interface) can get a new token using a refresh token that is then stored in the web-based user interface application. Other services cannot refresh the token. This represents indeed a challenge for long-running transactions or other kind of operations provided by specific services (e.g., analytics services) in today's distributed computing environments which rely heavily on distributed dedicated (software) services to solve specific computing tasks.

SUMMARY

According to one aspect of the present invention, a computer-implemented method for a token-based authorization in a data processing environment may be provided. The data processing environment may at least comprise a user system executing a user agent, an application server executing an application and an authorization server. The user agent may be in communicative contact via a first network connection with the application and the application may be in communicative contact via a second network connection with the authorization server. The application may provide access to a service providing a long-running operation. At least the service providing the long-running operation may be identifiable by an identifier.

The method may comprise accessing the application via the user agent, sending an access token and a refresh token from the authorization server to the application after an authorization protocol has been finished successfully, and triggering an execution of the service providing the long-running operation by the application.

Thereby the triggering may comprise requesting a transferable refresh token by the application from the authorization server, receiving the transferable refresh token from the authorization server by the application, wherein the transferable refresh token comprises at least a refresh token and the identifier for the service which provides the long-running operation, and starting an execution of the service providing the long-running operation by passing the transferable refresh token together with the identifier from the application to the service providing the long-running operation.

Furthermore the triggering may comprise passing the transferable refresh token together with the identifier of the service providing the long-running operation from the service providing the long-running operation to the authorization server, receiving, as response, an access and refresh token for the service providing the long-running operation, and continuing the service providing the long-running operation using refresh tokens receivable from the authorization server by the service providing the long-running operation.

According to another aspect of the present invention, a system for a token-based authorization in a data processing environment may be provided. Also, here, the data processing environment may comprise at least a user system executing a user agent, an application server executing an application and an authorization server. The user agent may be in communicative contact via a first network connection with the application and wherein the application may be in communicative contact via a second network connection with the authorization server. The application may provide access to a service providing a long-running operation, and at least the service providing the long-running operation may be identifiable by an identifier.

The security system may comprise an accessing unit adapted for accessing the application via the user agent, a sender adapted for sending an access token and a refresh token from the authorization server to the application after an authorization protocol has been finished successfully, and a triggering unit adapted for triggering an execution of the service providing the long-running operation by the application.

The triggering unit may comprise a requesting module adapted for requesting a transferable refresh token by the application from the authorization server, a receiver adapted for receiving the transferable refresh token from the authorization server by the application, wherein the transferable refresh token may comprise at least a refresh token and the identifier for the service which provides the long-running operation and a start unit adapted for starting an execution of the service providing the long-running operation by passing the transferable refresh token together with the identifier from the application to the service providing the long-running operation. The triggering unit may further comprise a passing module adapted for passing the transferable refresh token together with the identifier of the service providing the long-running operation from the service providing the long-running operation to the authorization server, a receiver adapted for receiving, as response, an access and refresh token for the service providing the long-running operation, and a continuation module adapted for continuing the service providing the long-running operation using refresh tokens receivable from the authorization server by the service providing the long-running operation.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
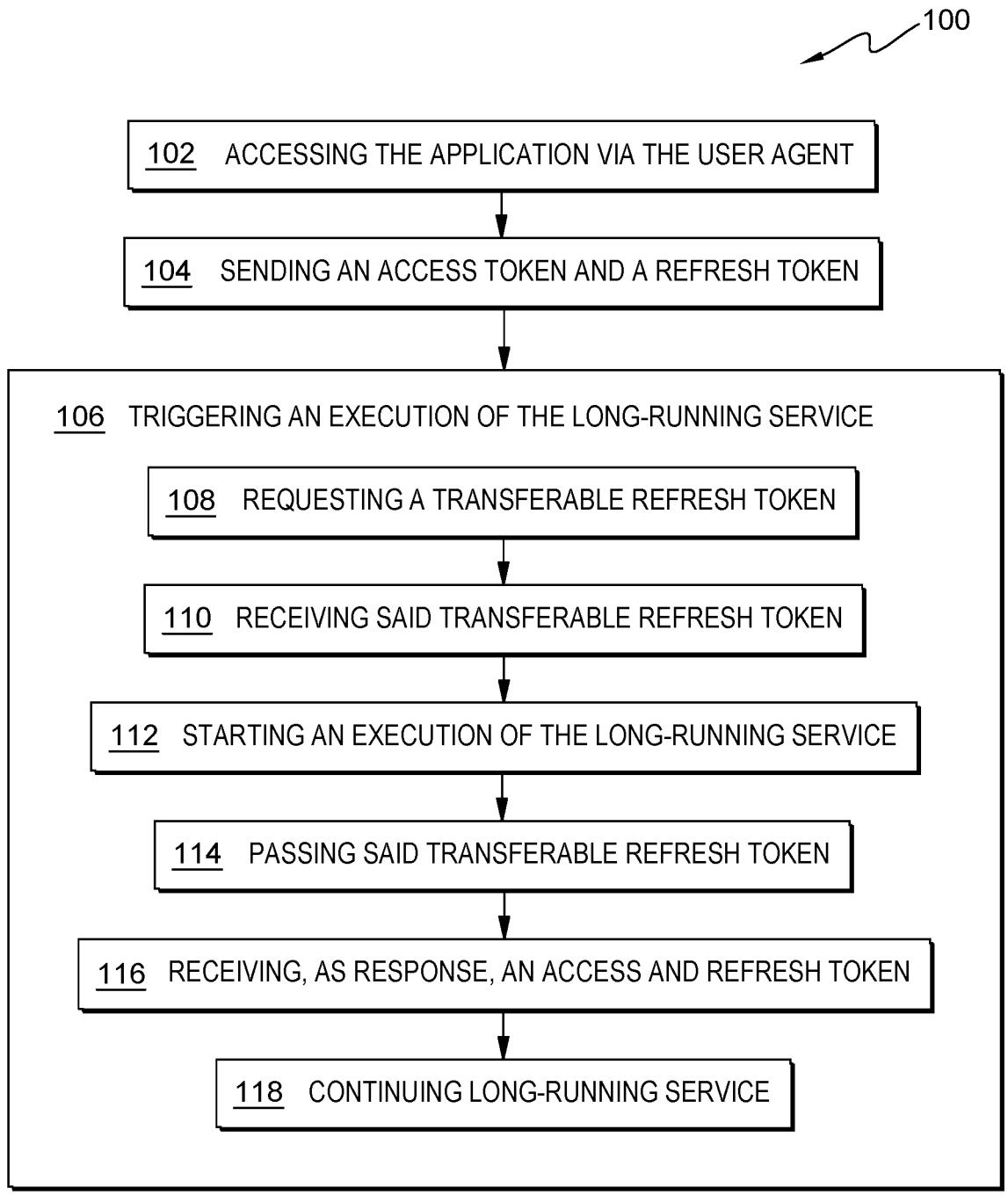

Various embodiments of the invention will be described, by way of example only, and with reference to the following drawings:

FIG. 1 shows a block diagram of an embodiment of the inventive computer-implemented method for a token-based authorization in a data processing environment, in accordance with an embodiment of the present invention.

Figure 2:
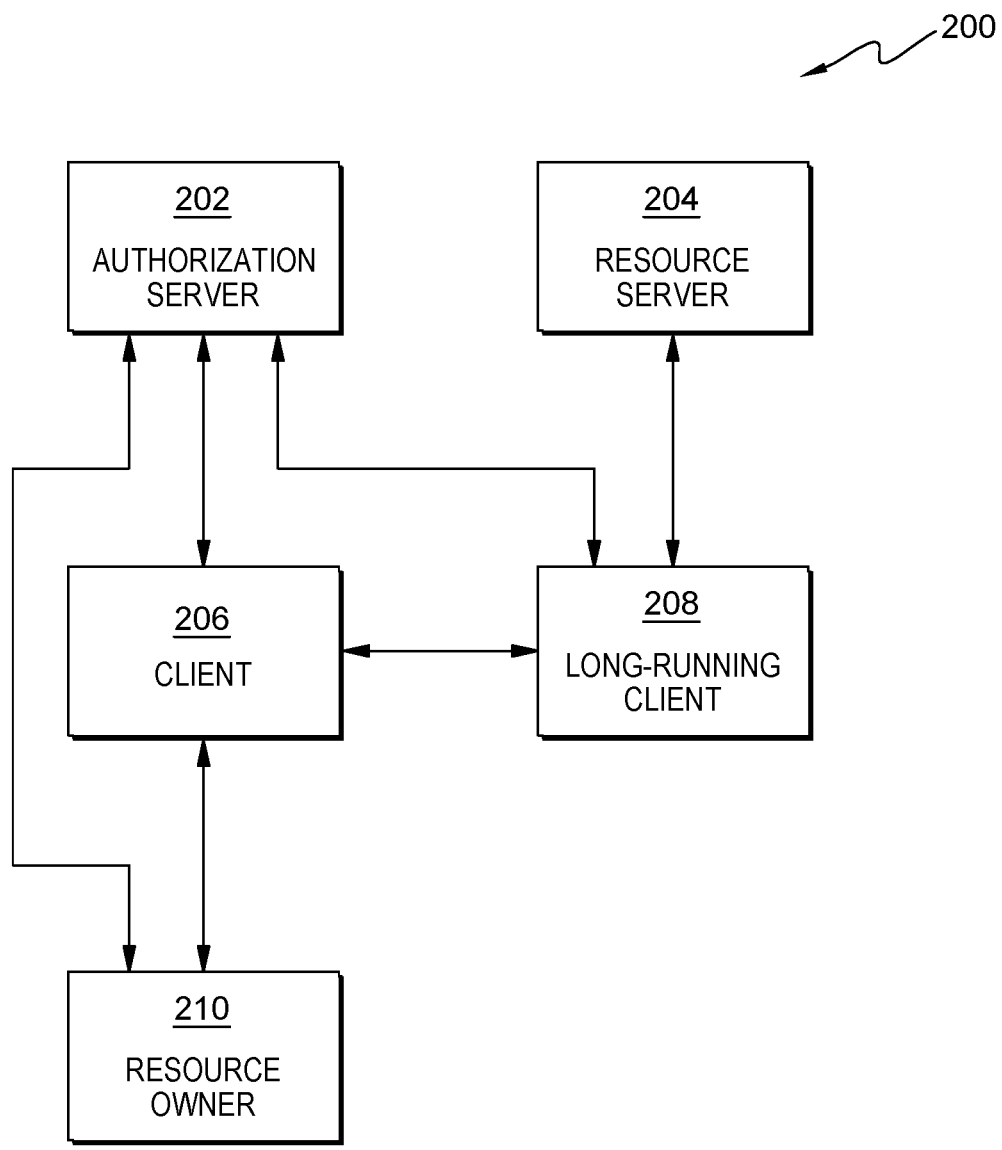

FIG. 2 shows a block diagram of elements involved in the interaction of the proposed and inventive concept, in accordance with an embodiment of the present invention.

Figure 3A:
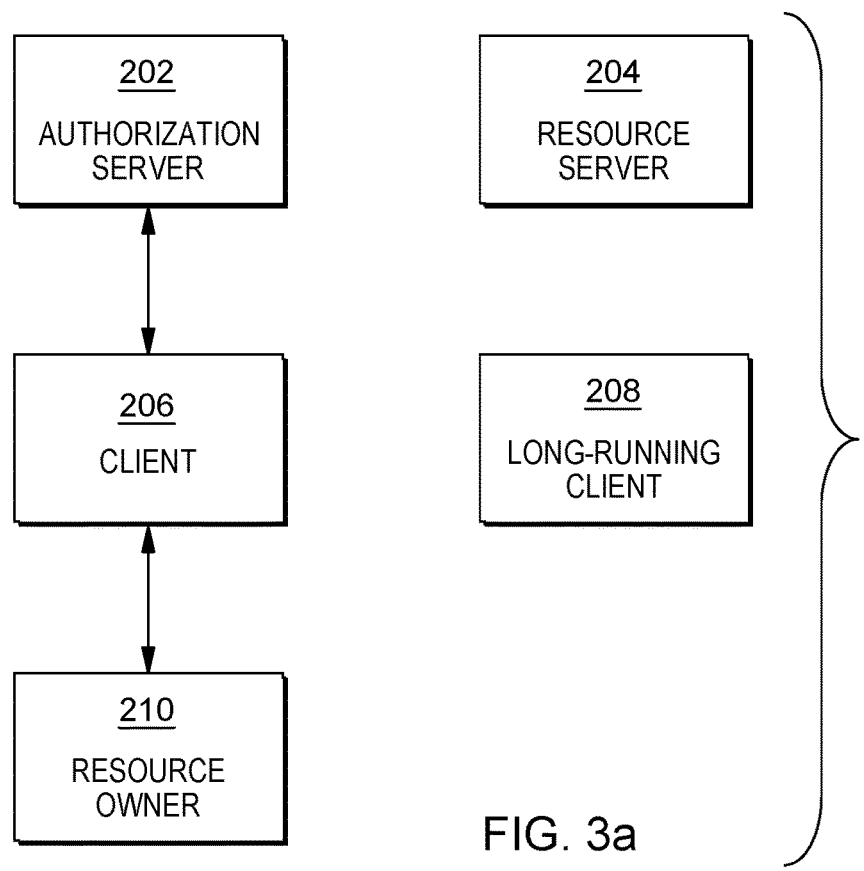

FIG. 3a shows a block diagram of interaction among components of an implementable embodiment of the method, in accordance with an embodiment of the present invention.

Figure 3B:
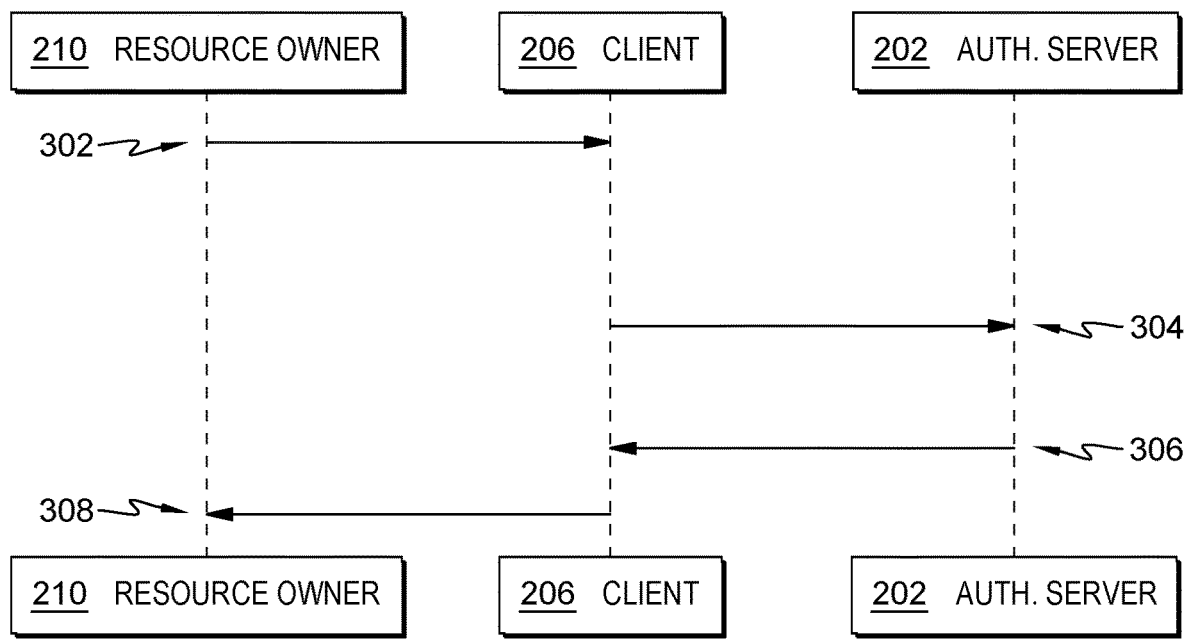

FIG. 3b shows a state and information exchange diagram according to interactions of FIG. 3a, in accordance with an embodiment of the present invention.

Figure 4A:
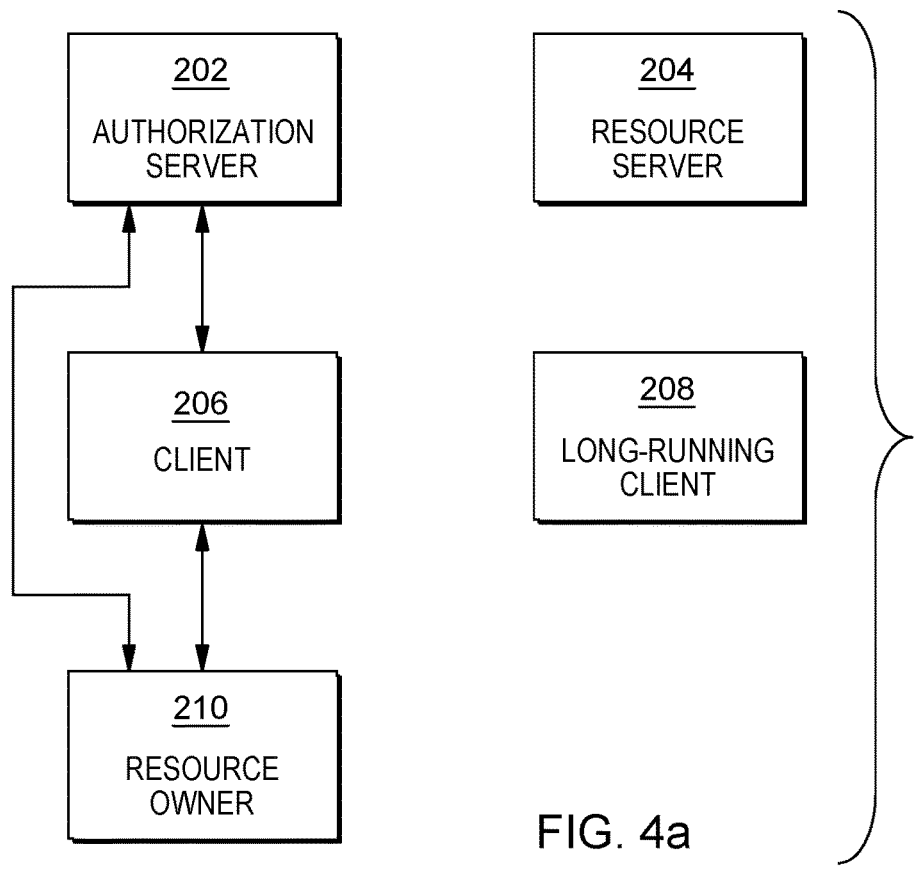
Figure 4B:
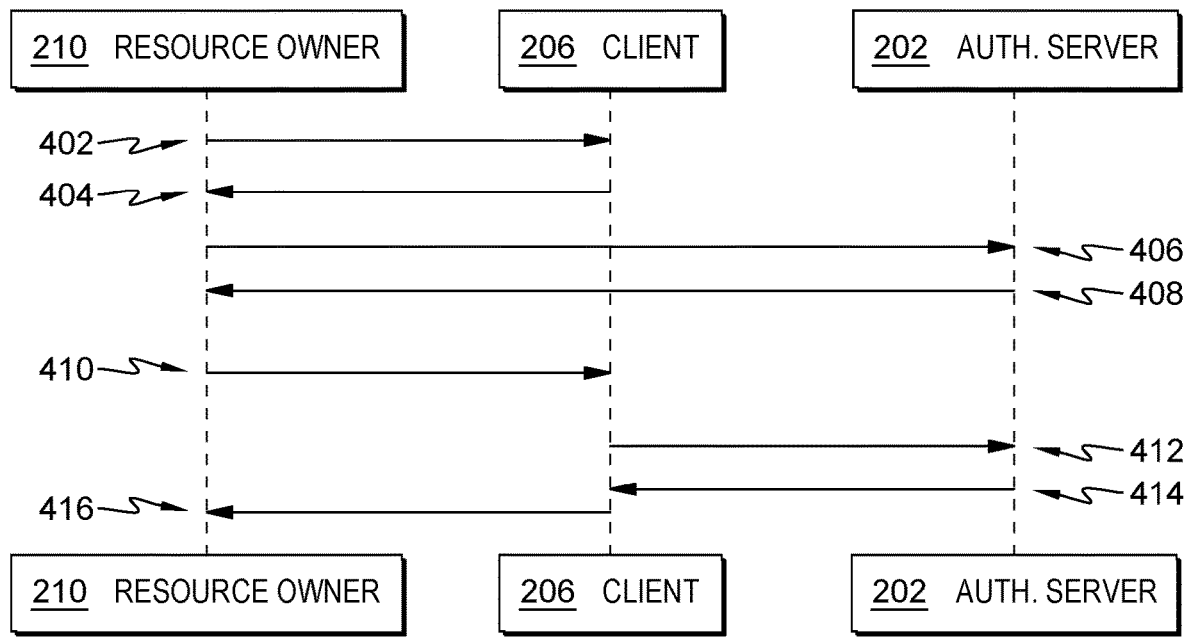

FIG. 4a and FIG. 4b show interacting involved units and a related state and information exchange diagram for the implementable embodiment of the proposed method, in accordance with an embodiment of the present invention.

Figure 5A:
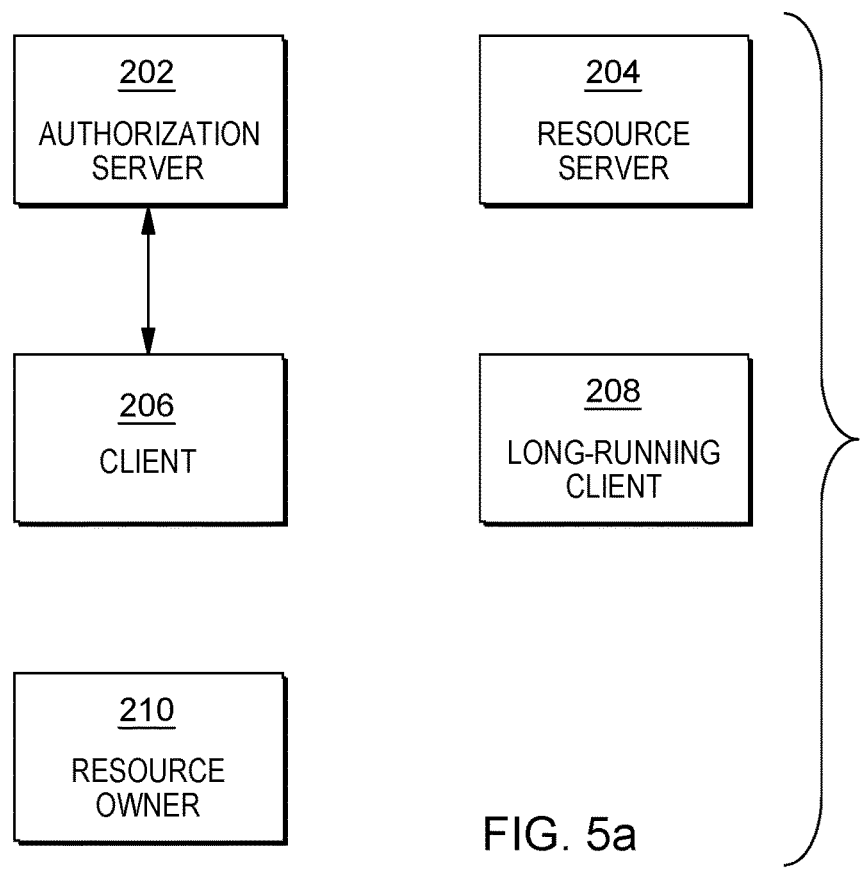
Figure 5B:
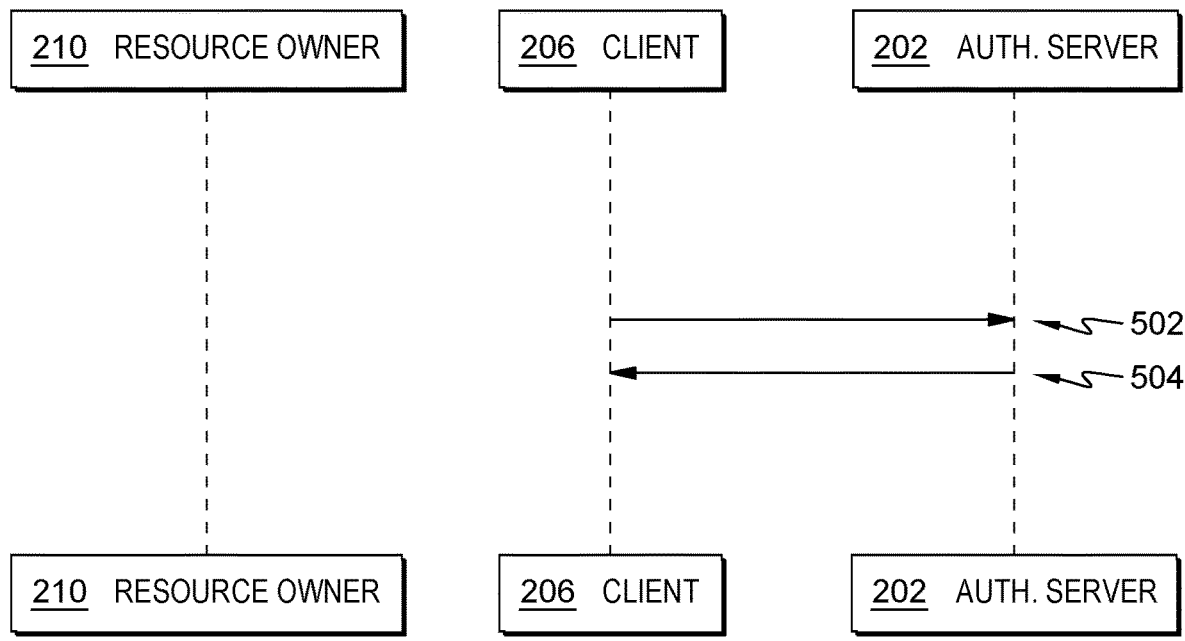

FIG. 5a and FIG. 5b show interacting involved units and a related state and information exchange diagram for another process of the implementable embodiment of the proposed method, in accordance with an embodiment of the present invention.

Figure 6A:
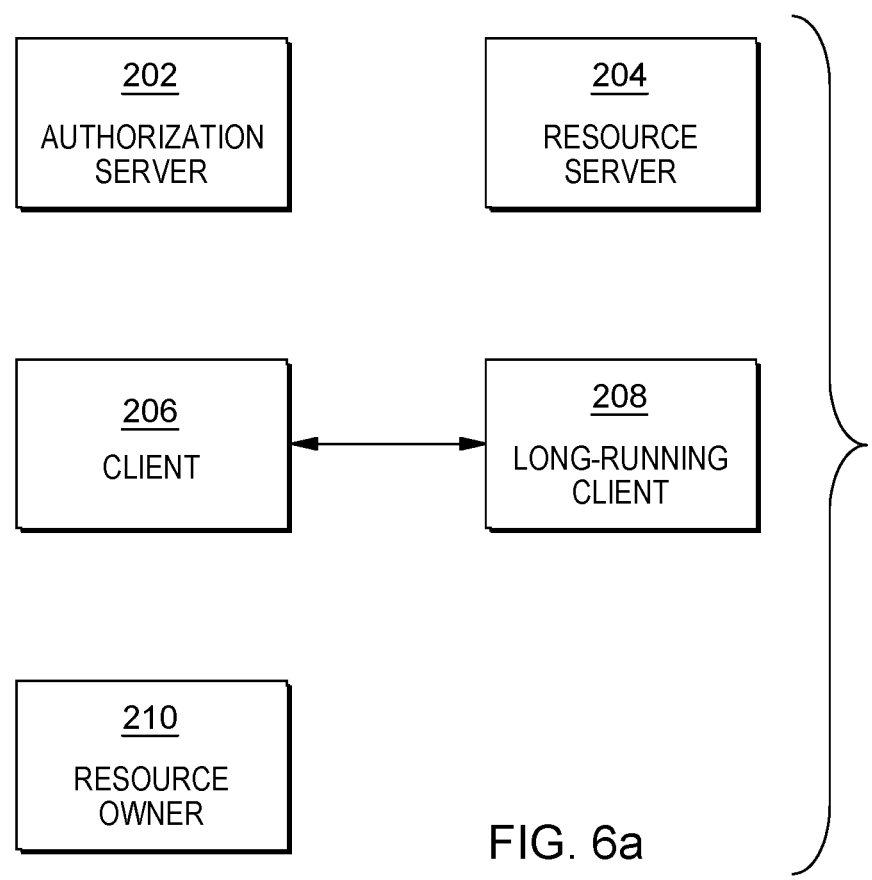
Figure 6B:
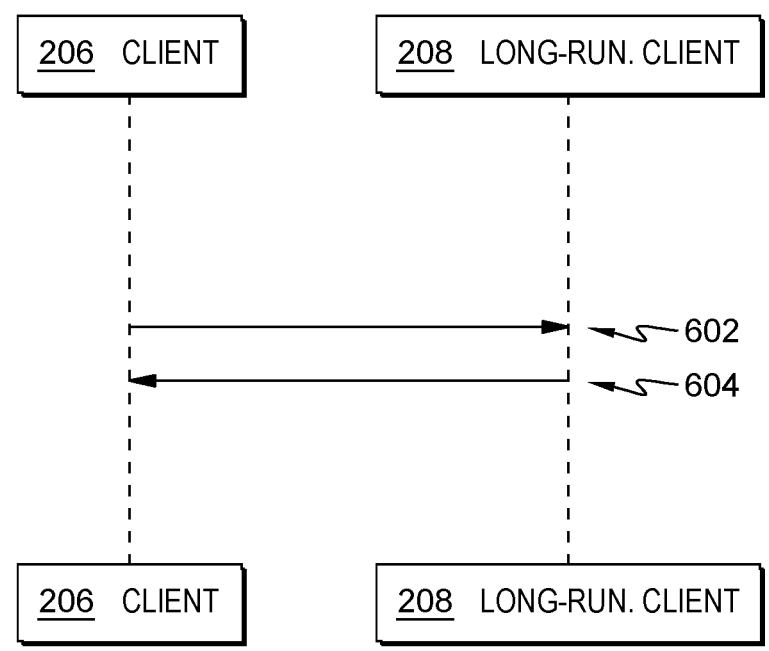

FIG. 6a and FIG. 6b show interacting involved units and a related state and information exchange diagram for an additional process of the implementable embodiment of the proposed method, in accordance with an embodiment of the present invention.

Figure 7A:
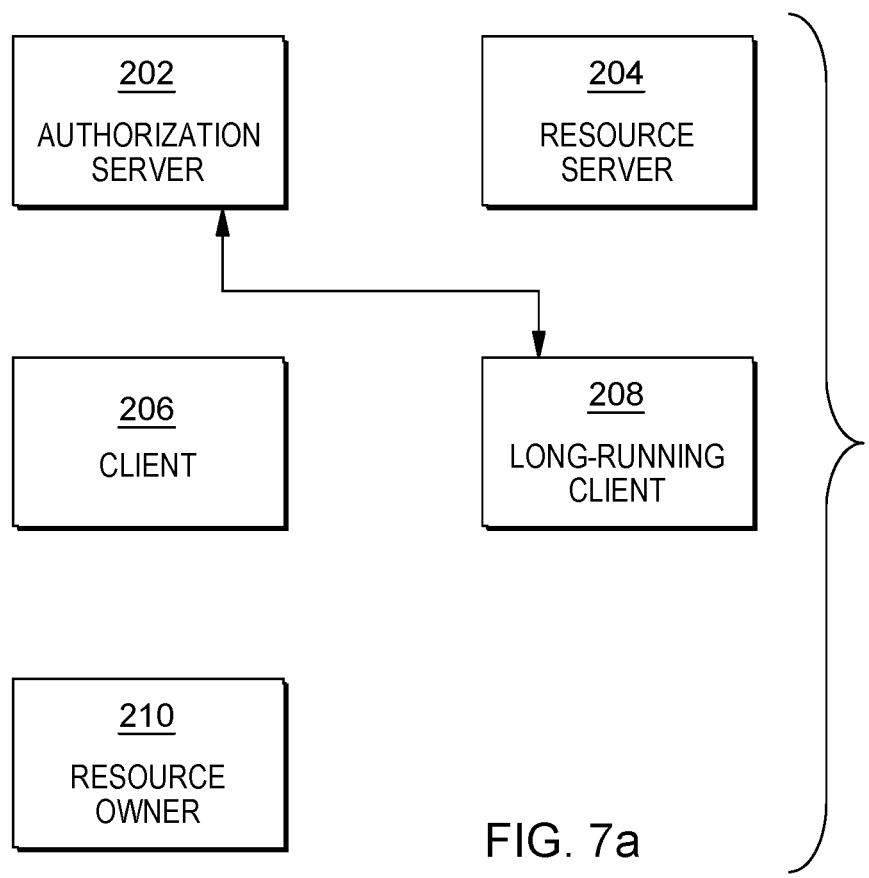
Figure 7B:
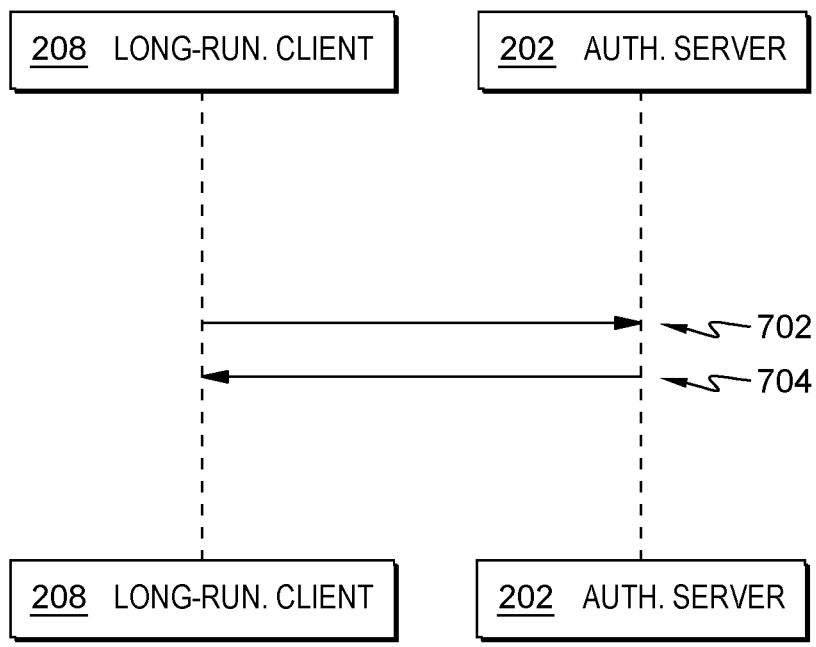

FIG. 7a and FIG. 7b show interacting involved units and a related state and information exchange diagram for yet another process of the implementable embodiment of the proposed method, in accordance with an embodiment of the present invention.

Figure 8A:
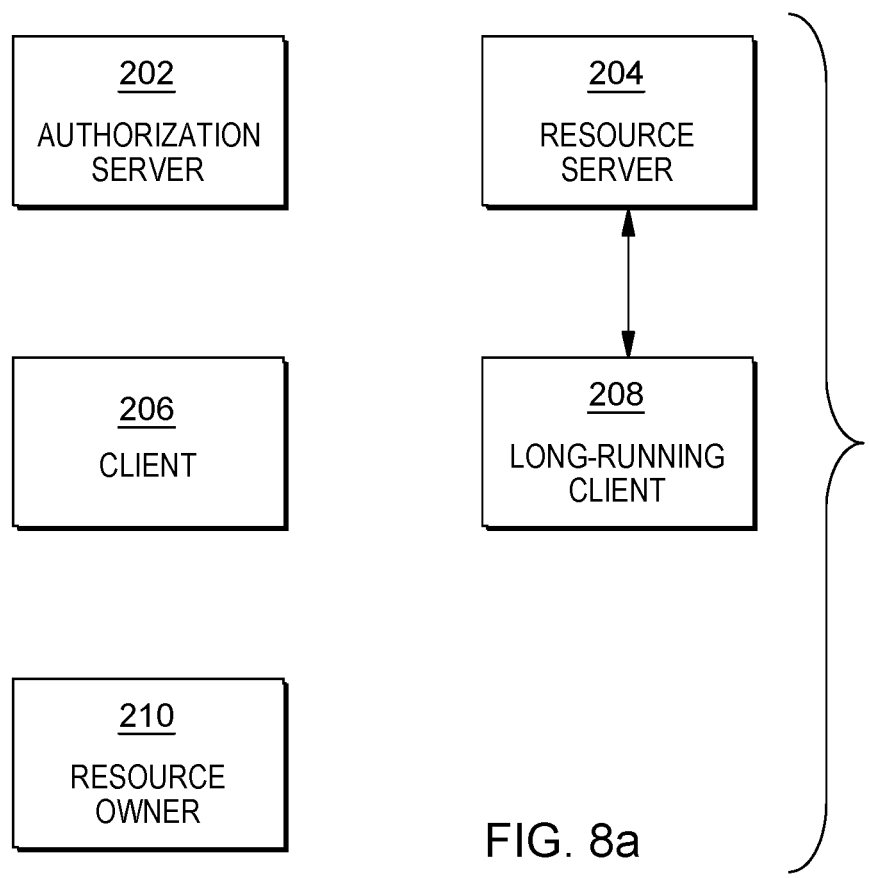
Figure 8B:
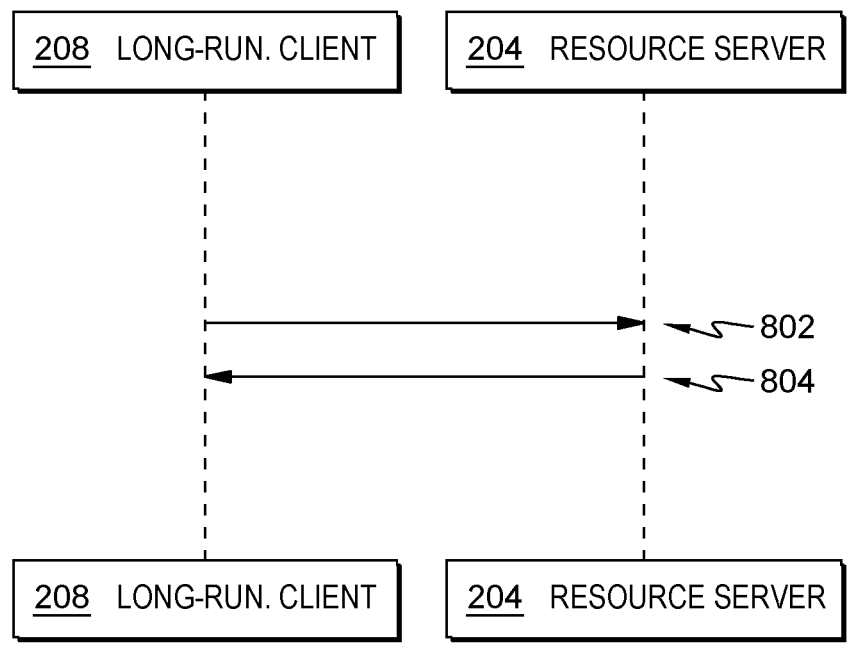

FIG. 8a and FIG. 8b show interacting involved units and a related state and information exchange diagram for a further process of the implementable embodiment of the proposed method, in accordance with an embodiment of the present invention.

Figure 9A:
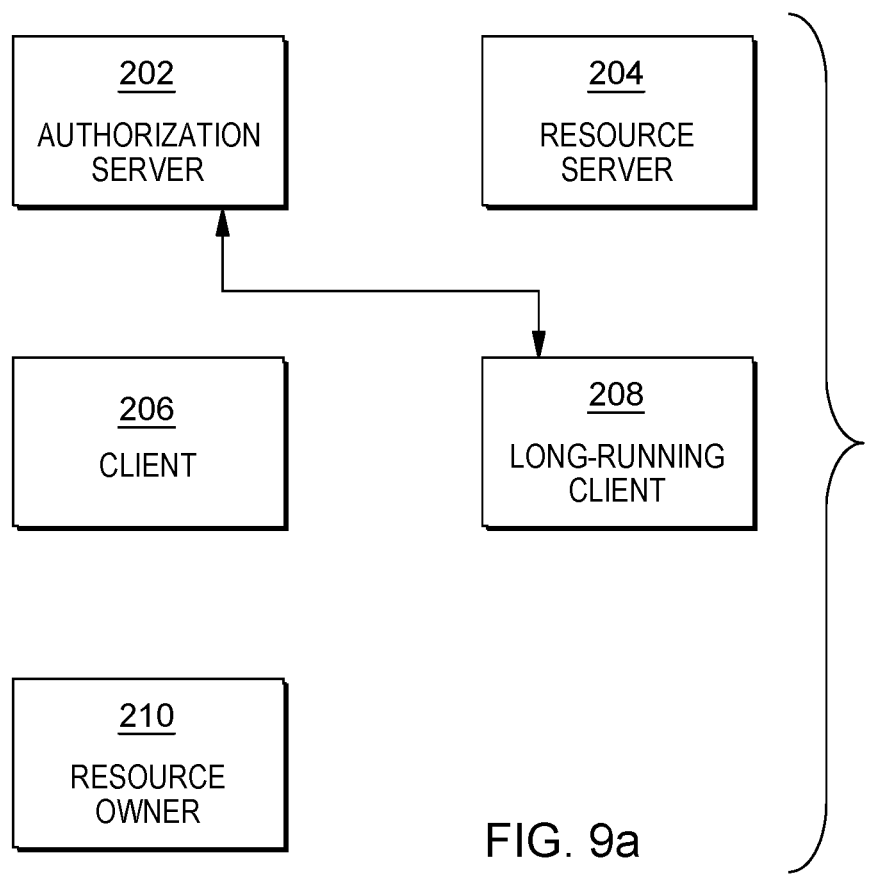
Figure 9B:
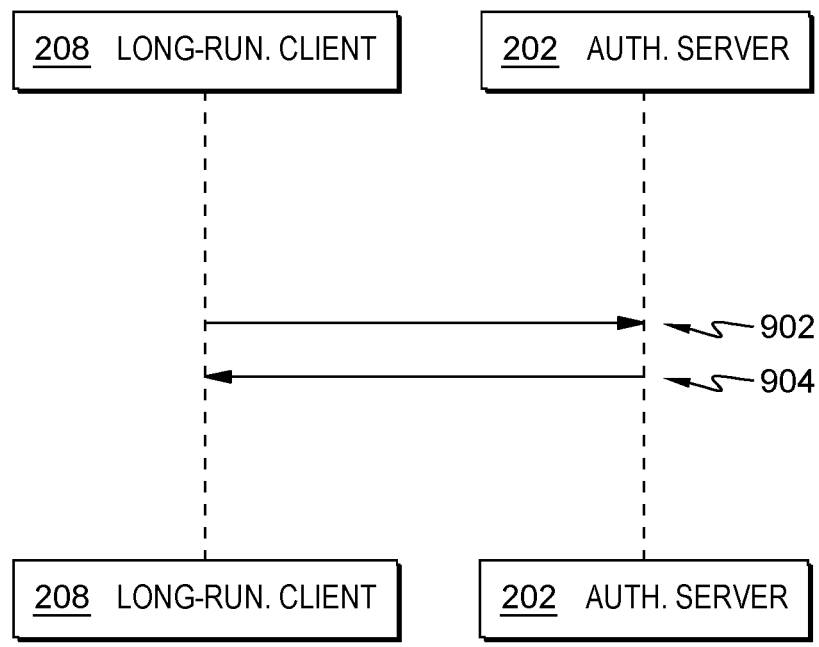

FIG. 9a and FIG. 9b show interacting involved units and a related state and information exchange diagram for a concluding process of the implementable embodiment of the proposed method, in accordance with an embodiment of the present invention.

Figure 10A:
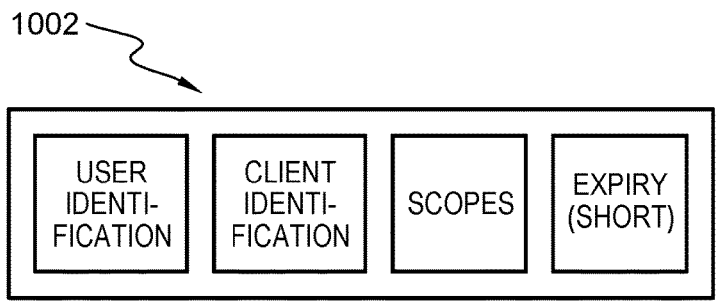
Figure 10B:
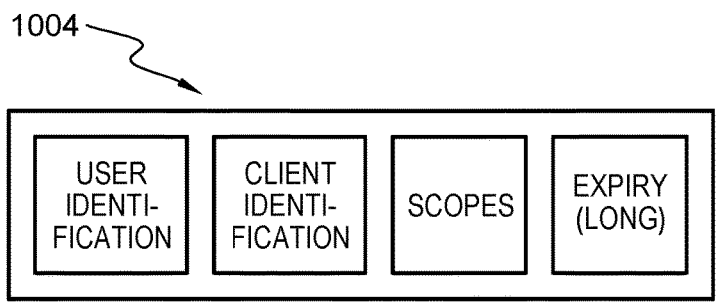
Figure 10C:
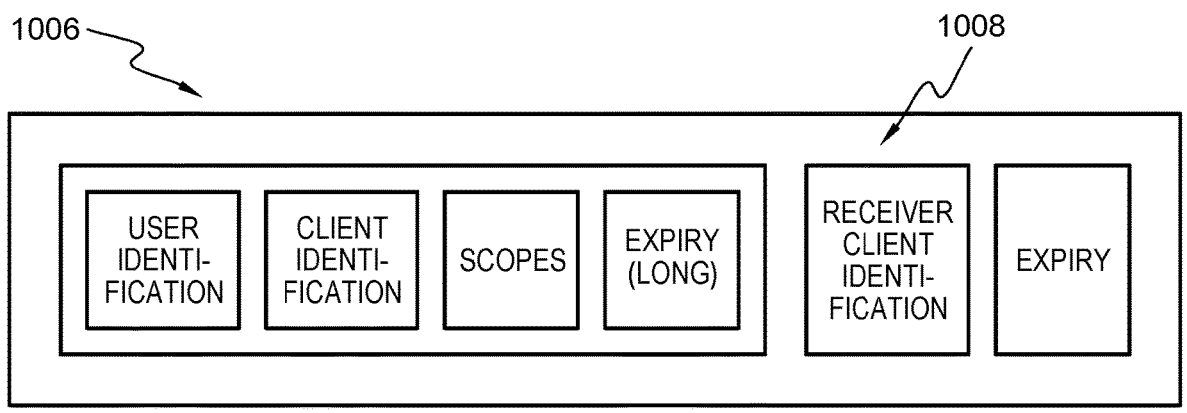

FIG. 10a, FIG. 10b, FIG. 10c show an access token, a refresh token and a transferable refresh token respectively, in accordance with an embodiment of the present invention.

Figure 11:
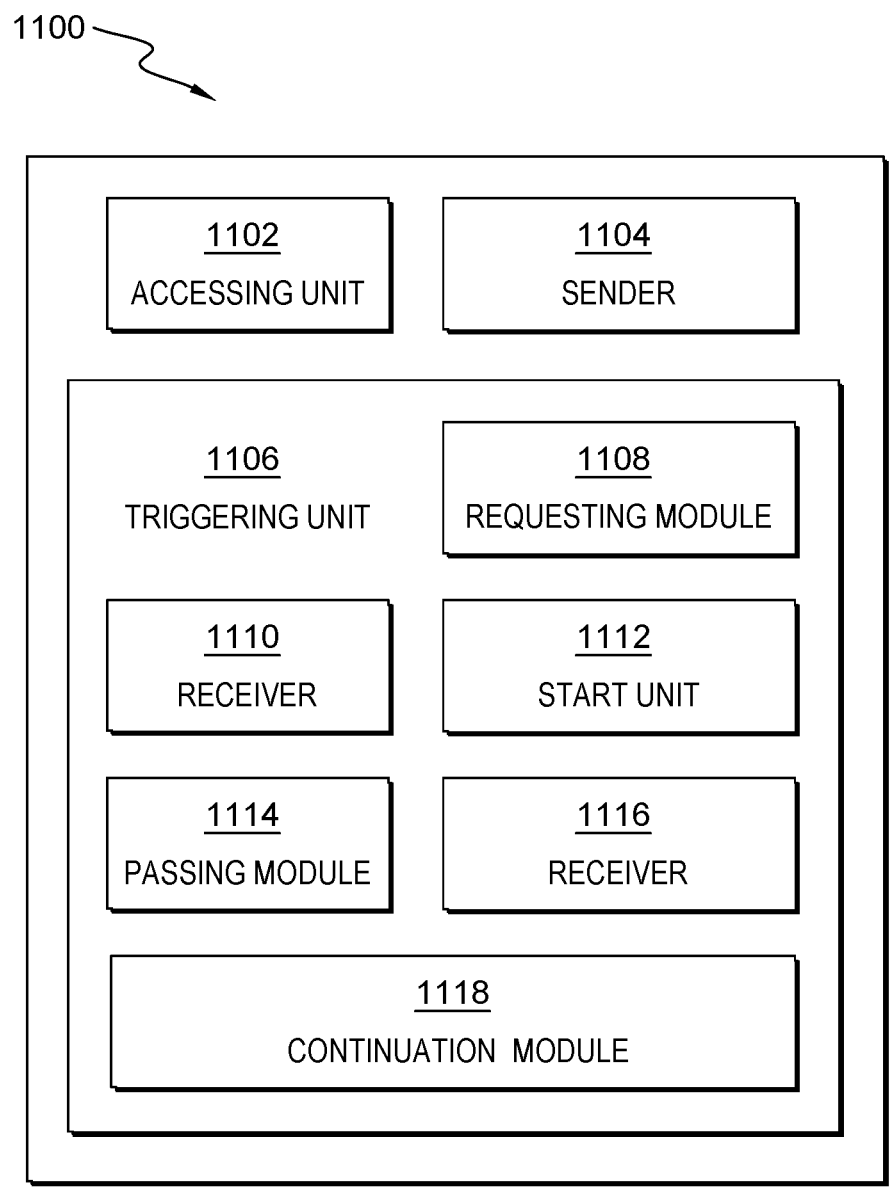

FIG. 11 shows a block diagram of the security system for a token-based authorization in a data processing environment, in accordance with an embodiment of the present invention.

Figure 12:
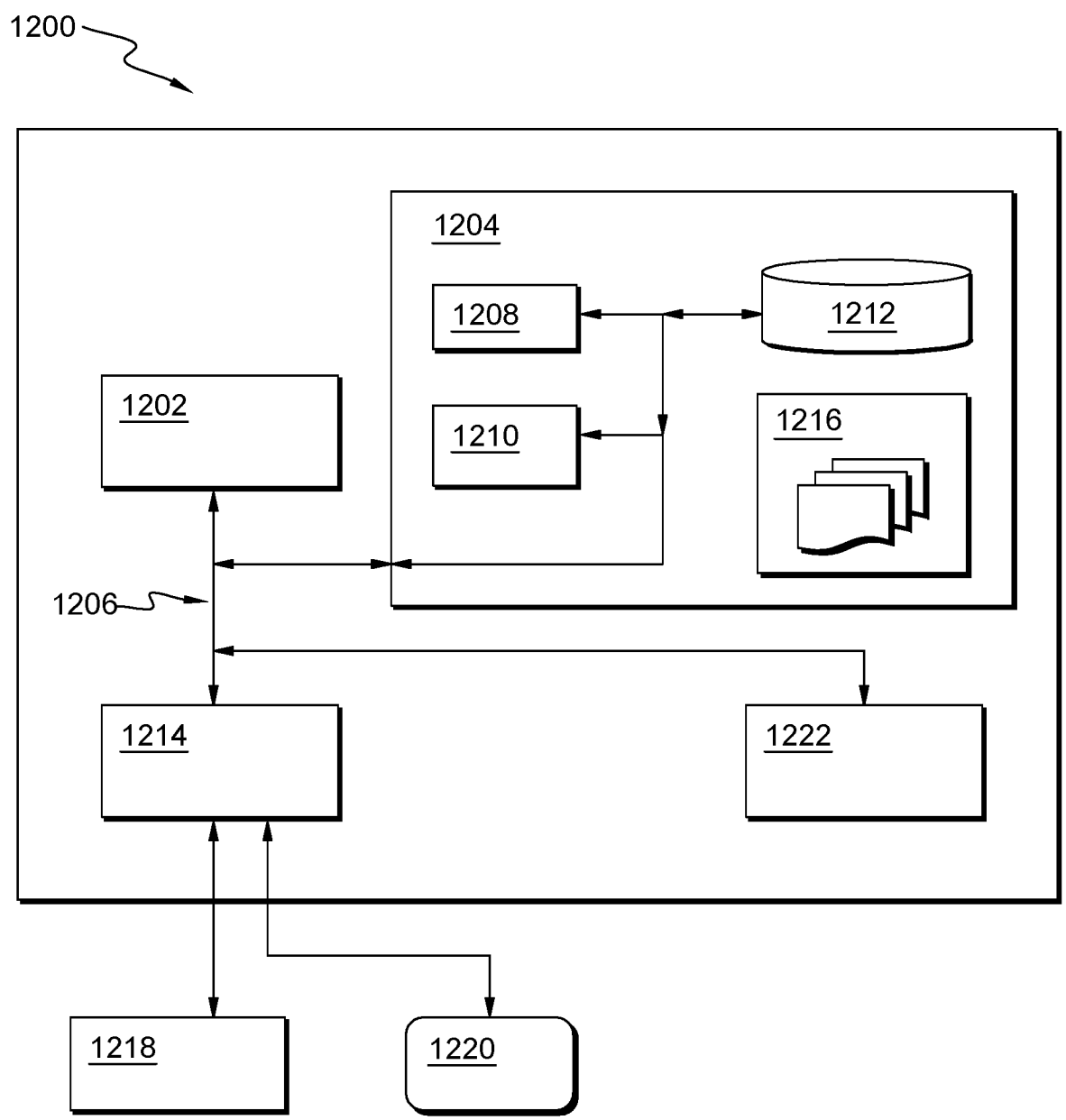

FIG. 12 shows a block diagram of a computing system instrumental for an implementation of the proposed method, in accordance with an embodiment of the present invention.

DETAILED DESCRIPTION

In the context of this description, the following conventions, terms and/or expressions may be used:

The term 'token-based authorization' may denote an authentication and authorization process and a related protocol known in the art and being described in the context of the open standard of OAuth 2.0. One element is to exchange tokens between a calling and a called service, where an authorization server controls the creation of the tokens. The connections between a calling and a called service may be established for entities underlying a predefined security concept.

The term 'data processing environment' may denote a network, comprising different computing nodes having different characteristics. Examples of such computing nodes are end-user systems, application servers, database servers, compute servers—in particular those providing long running operations. Other types of servers or nodes may comprise resource nodes and/or authentication and authorization service.

The term 'user system' may denote one of the nodes being operated by an end-user. Typically, the end-user may access the network of computers via a browser. The browser may be implemented in two parts: a user interface and a backend service, typically being executed on the user system and exemplary denoted as user agent. The user agent may represent the actual end-user in the network of computers.

The term 'application server' may denote one or more dedicated computing systems, providing application services. Typically, the user agent may access one application server, providing a specific service. In the background, the application server may access services from other application servers.

The term 'authorization server' may denote a specialized server—often implemented as a dedicated hardware system—enabled to authenticate a specific end-user and to authorize access of end-user related actions in the network of computing nodes under a predefined security concept.

The term 'network connection' may denote any technical connection between two systems, in particular, between software services using underlying hardware devices. Thus, the network connection may be a wireline connection or a wireless connection. One example of protocols being used for the network connection is the Internet protocol.

The term 'long-running operation' may denote an application which may be very compute and/or transaction intensive, such as a data analytics job, a complex search query, a service involving an artificial intelligence system, a backup process, a data transmission process for a large amount of data, etc. A common characteristic of such services providing long-running operations is that the runtime typically exceeds an expiry time of access tokens.

The term 'identifier' may denote a digital code used to identify entities in a computing system or within a network of computing systems, protocols and/or applications.

The term 'access token' may denote a digital code authorizing an application (or application service) to access a certain resource within a network of computers. In the issuance of an access token, a predefined security system and related protocols may be involved. Basically, the access token allows an application (or another resource) using the services of another resource in a computer network.

The term 'refresh token' may be used—in the context of the above-mentioned access token and related security protocols—to continue the access on the related resource after the original access token has been expired. Thus, refresh tokens may be issued on a regular basis in order to allow the resource or service to continue its operation accessing other resources.

The term 'transferable refresh token' may denote a newly introduced concept as part of the proposed method and related system. In traditional security concepts, access token may be provided to resources in order to access another resource. However, such an access token is not transferable to another resource. Other mechanisms relying on not so secure protocols have to be used as "quick fix" in order to overcome the limitations of traditional security architectures. The proposed concept can replace the "quick fixes" with an authorization protocol having the same security standards as the utilized underlying security protocol.

The term 'OAuth 2.0 protocol' may denote the known open standard protocol OAuth for access delegation, commonly used as a way for Internet users to grant websites or applications access to the user's information on other websites but without providing the passwords. This mechanism is used by world renowned Internet companies to permit users to share information about accounts with third party applications or websites.

Generally, OAuth provides to clients a "secure delegated access" to server resources on behalf of a resource owner. In addition, OAuth specifies a process for resource owners to authorize third-party access to server resources without sharing credentials. Designed specifically to work with Hypertext Transfer Protocol (HTTP), OAuth essentially allows issuance of access tokens to third-party clients by an authorization server, with the approval of the resource owner. The third party can then use the access token to access the protected resources hosted by the resource server.

The term 'scope' may define the level of activity and application (or another resource) is granted. For example, an application may have read access to certain data, but no write or delete rights. Additionally, read access may be limited to the predefined set of data.

In the following, a detailed description of the figures will be given. All instructions in the figures are schematic. Firstly, a block diagram of an embodiment of the inventive computer-implemented method for a token-based authorization in a data processing environment is given. Afterwards, further embodiments, as well as embodiments of the system for a token-based authorization in a data processing environment, will be described.

Embodiments of the present invention recognize that a need exists to equip long-running application services with the same level of security and authentication available for user-processes. At the same time, this additional level of security (i.e., authentication) shall be transparent to a user.

FIG. 1 shows a block diagram of an embodiment of the computer-implemented method 100 for a token-based authorization in a data processing environment. In an example embodiment, the data processing environment can be a cloud computing environment or another system based on a service-oriented architecture.

The data processing environment comprises at least a user system, which may typically be equipped with a browser operated by an end user. The data processing environment may also execute a user agent representing actions as the end-user. The user agent may represent a back-end service of the browser.

The data processing environment also comprises an application server executing an application, typically a web application, and an authorization server, which may operate generally according to OAuth 2.0 rules that are enhanced by embodiments of the present invention further described herein.

The user agent is in communicative contact via a first network connection with the application and the application is in communicative contact via a second network connection with the authorization server.

The application provides access to a service providing a long-running operation (e.g., a specialized system like a data analytics application (or a part thereof), a data transfer program, a task of an artificial intelligence system and equivalent services requiring comparably long execution times). At least the service providing the long-running operation is identifiable (i.e., recognizable) by an identifier.

Method may comprise accessing (in step 102) the application via the user agent, sending (in step 104) an access token and a refresh token from the authorization server to the application after an authorization protocol has been finished successfully, and triggering (in step 106), an execution of the service providing the long-running operation by the application. In additional embodiments, the user agent can perform the triggering.

Thereby, the triggering process of method 100 (i.e., step 106) further comprises requesting (in step 108) a transferable refresh token by the application from the authorization server, receiving (in step 110) the transferable refresh token from the authorization server by the application, wherein the transferable refresh token comprises at least a refresh token and the identifier for the service which provides the long-running operation.

Additionally, the triggering process of method 100 (i.e., step 106) further comprises starting (in step 112) an execution of the service providing the long-running operation by passing the transferable refresh token together with the identifier from the application to the service providing the long-running operation, passing (in step, 114) the transferable refresh token together with the identifier of the service providing the long-running operation from the service providing the long-running operation to the authorization server, receiving (in step 116) as response, an access and refresh token for the service providing the long-running operation, and continuing (in step 118) the service providing the long-running operation using refresh tokens receivable—in particular, directly and regularly—from the authorization server by the service providing the long-running operation.

FIG. 2 shows a block diagram 200 of elements involved in the interactions of embodiments of the present invention. The resource owner 210 (e.g., an end-user sitting in front of a web browser) is interacting with a client 206 (e.g., a web application running on an application server (not shown)) that is offering a service to the end-user. In another embodiment, instead of the resource owner as a person, a user agent may be used as the interacting component in communicative contact with other elements of FIG. 2.

For an interactive login experience, the resource owner 210 (i.e., the user agent) is redirected to the authorization server 202 for an authentication and authorization of the client 206 access request.

The client 206 (e.g., the web application) interacts with the authorization server 202 to retrieve an access token. Additionally, as part of the proposed concept, the client 206, also interacts with the authorization server 202 to retrieve a transferable refresh token. The client 206 passes the transferable refresh token to the long-running client 208 (e.g., via an API call).

The long-running client 208 interacts with the authorization server 202 to securely unwrap that transferable refresh token and to retrieve an access token together with a refresh token. The same interaction is required to refresh the access token later. The long-running client 208, then interacts with a resource server 204 to access the resources on the resource owner's behalf.

In an example embodiment, as an underlying authorization (and authentication) procedure, the concepts of OAuth 2.0 may be applied. However, it should also be clear that the transferable refresh token is not part of the OAuth 2.0 system concept.

In brief, the general flow of interaction steps may be described as follows, in accordance with embodiments of the present invention. The client 206 retrieves an access token and one or more refresh tokens from the resource owner 210. The client 206 retrieves the transferable refresh token from the authorization server 202. The client 206 invokes the long-running client 208 and passes the transferable refresh token. The long-running client 208 retrieves an access token and one or more refresh tokens from the transferable refresh token. The long-running client 208 invokes the resource server 204 with the appropriate access token. The long-running client 208 refreshes the access token to continue invoking the resource server 204.

FIG. 3a depicts a block diagram of the interaction of the resource owner 210 (i.e., the user agent representing an end-user) interacting with a client 206 (e.g., eight web application) to start, for example a long-running data analytics job. In additional embodiments, instead of the data analytics job, other long-running operations are possible, such as a long-running transaction(s), a long-running data transmission, a data cleansing process involving many dependencies between variables, a complex access to an artificial intelligence system, etc.

Referring now to FIG. 3b (which shows a state and information exchange diagram of the process described with regard to FIG. 3a), the OAuth 2.0 standard defines two ways to get a token (e.g., access token refresh token) that the client 206 retrieves for the resource owner 210 (or corresponding user agent). In the first way, the resource owner 210 sends (in step 302) a username/password combination to the client 206. The client 206 takes the credentials, and a respective client identifier of the client 206, and secret and sends (in step 304) the token request to the authorization server 202. The authorization server returns (in step 306) an access token and a refresh token that can only be used by the client 206. Typically, the client 206 sends (in step 308) back a session cookie, or similar, to maintain a session with the resource owner.

In another embodiment, referring now to FIG. 4a and FIG. 4b, OAuth 2.0 retrieves tokens for the client 206 without having to pass the username/password to the client 206. The client 206 is redirecting (in step 404) after the resource owner 210 attempting (in steps 402 and 404) to login to the client 206 (e.g., utilizing credentials from the resource owner 210, in particular, the related request including username/password, client_ID and redirect URL) to the authorization server 202. Together with the redirection, the client 206 identifier and a redirect URI (universal resource identifier) is passed (in step 406) to the authorization server 202. The redirect URI can later be used to send the resource owner 210 back to the client 206, after an authorization/authentication is successfully done with the authorization server 202.

The resource owner 210 follows (in step 406) the redirect to the authorization server 202, passes (in step 408) the client identifier and redirect URI, and authenticates with username and password (or similar methods). After a successful validation, the authorization server 202 sends back the resource owner to the client 206 using the redirect URI and an authorization_code to that response (compare step 408).

Then, the client 206 takes (in step 410) the authorization code and his client identifier and secret, and retrieves (in step 414), (e.g., after requesting (in step 412) with "POST/token withgrant_type=authCode," client-ID, client_secret, authCode) an access token and refresh token from the authorization server 202. Similarly, to as previously described, the tokens can only be used by the related client identifier. The client 206 sends (in step 416) back a session cookie, or similar, to keep a session with the resource owner 210.

In various embodiments, the client 206 retrieves the transferable refresh token from the authorization server 202. In these embodiments, the client 206 can intend to invoke an API on the long-running client 208. Usual API invocations would use the access token of proof to the authorization of that API call. In this case, the long-running client 208 means that the operation of the client 206 will last longer than the maximum access token expiration time. However, passing an access token here is not a desirable process, as the operation will eventually fail. Passing the refresh token instead does not solve this issue, as the authorization of the long-running client 208, (i.e., the client identifier and secret of the long-running client 208) is different from the client identifier of the original instance of client 206. As refresh tokens can only be used by the client that created the refresh token, the refresh token would be not be beneficial to the long-running client 208.

For the above-described situation, embodiments of the present invention introduce the transferable refresh token 1006, as shown in FIG. 10c. The token type of the transferable refresh token 1006 is similar to the nominal refresh token 1004, shown in FIG. 10b, but containing additional information. For comparison reasons, FIG. 10a shows an access token 1002. In order to create such a transferable refresh token 1006, the client 206 uses the refresh_token grant type and a special response type. The client 206 passes (compare FIG. 5b, 502; FIG. 5b related to FIG. 5a showing the related interacting components.) information including the refresh token 1004, the client identifier and client secret as authentication information for this client 206, and the client identifier of the long-running client 208. In an example embodiment, a pseudo format could be: POST/token, grant_type=refresh_token, client_id, client_secret, refresh_token, receive_client_id, expire, response_type=transferable_refresh_token. In return, the client 206 will receive (compare FIG. 5b, 504) the transferable refresh token 1006.

The client identifier of the long-running client 208 could be stored as receiver client identifier 1008 to indicate that only aforementioned client identifier will be able to consume the transferable refresh token 1006. The transferable refresh token 1006 contains the original expiry time of the refresh token 1004, which was passed to the authorization server 202, but also holds a separate expiry time that indicates how long the transferable refresh token 1006 can be consumed (i.e., converted into an access token and a refresh token).

FIG. 6*a* and FIG. 6*b* depict involved components and a related state information flow and diagram of the client 206 invoking the long-running client 208 and parsing the transferable refresh token.

After the client 206, has retrieved that transferable refresh token from the authorization server 202, the client 206 can call the long-running client 208. The related long-running operation is started (in step 602) with an API call that passes all relevant parameters for the operation and the transferable refresh token that allows the long-running client 208 to refresh the access token at any time. The start API will return (in step 604) an operation identifier to allow status updates for the long-running client 208 later.

FIG. 7*a* and FIG. 7*b* show involved components and a related state information flow and diagram of the long-running client 208 retrieving an access token and a refresh token from the transferable refresh token.

In an example embodiment, the long-running client 208 can unwrap the transferable refresh token before using the token. In this embodiment, the long-running client 208 is involving the authorization server 202 and passes (in step 702) the transferable refresh token and the long-running client's 208 authentication (i.e., the related client identifier and secret). In one scenario, a potential format may be: POST/token, grant_type=transferable_refresh_token, client_id, client_secret, transferable_refresh_token.

The authorization server 202 validates to the client the identifier and secret, unwraps the transferable refresh token, compares the client identifier of the long-running client 208 with a client identifier that is stored inside the transferable refresh token as valid receiver of that token. If the long-running client 208 identifier is contained in the transferable refresh token, the operation can succeed. Finally, the expiry time of the transferable refresh token is validated.

After validation being successfully completed, a new access token/refresh token pair, owned by the client identifier of the long-running client 208, is created and returned (in step 704) to the caller (i.e., the long-running client 208).

FIG. 8*a* and FIG. 8*b* show involved components and a related state information flow and diagram of the long-running client 208 invoking the resource server 204 with an appropriate access token.

After the long-running client 208 has received its pair of access token and refresh token, an execution of the long-running operation can proceed. If the access token is not expired, the long-running client 208, can reuse the access token when calling (in step 802) the resource server 204. Finally, the long-running client 208 receives (in step 804) a result from the resource server 204.

FIG. 9*a* and FIG. 9*b* show involved components and a related state information flow and diagram the long-running client 208 refreshing the access token in order to continue invoking the resource server 204.

During the execution of the long-running operation, the long-running client 208 will eventually reach the expiration time of the access token. If the access token is expired, then the access token needs to be replaced by a new access token with a new expiry time. In such a scenario, the long-running client 208 may use the standard OAuth 2.0 refresh token approach and can reissue a refresh_token API call (in step 902). In one scenario, a format may be: POST/token, grant_type=refresh_token, client_ID, client_secret, refresh_token= . . . . As a result, a new access token and a new refresh token will be returned (in step 904) from the authorization server 202 to the long-running client 208. Thus, in order to keep the long-running operation (i.e., the interaction between the long-running client 208 and the resource server 204) going, the client 206 and the resource owner 210 are not involved at in this process.

FIG. 11 shows a block diagram of the security system 1100 for a token-based authorization in a data processing environment. The data processing environment comprises at least a user system executing a user agent, an application server executing an application and an authorization server. The user agent is in communicative contact via a first network connection with said application and wherein said application is in communicative contact via a second network connection with said authorization server. The application provides access to a service providing a long-running operation, wherein at least said service providing said long-running operation is identifiable by an identifier.

The security system comprises an accessing unit 1102 adapted for accessing said application via said user agent, a sender 1104 adapted for sending an access token and a refresh token from said authorization server to said application after an authorization protocol has been finished successfully, and a triggering unit 1106 adapted for triggering an execution of said service providing said long-running operation by said application.

The triggering unit comprises a requesting module 1108 adapted for requesting a transferable refresh token by said application from said authorization server, a receiver 1110 adapted for receiving said transferable refresh token from said authorization server by said application, wherein said transferable refresh token comprises at least a refresh token and said identifier for said service which provides said long-running operation, and a start unit 1112 adapted for starting an execution of said service providing said long-running operation by passing said transferable refresh token together with said identifier from said application to the service providing said long-running operation.

Additionally, the triggering unit comprises a passing module 1114 adapted for passing said transferable refresh token together with said identifier of said service providing said long-running operation from said service providing said long-running operation to said authorization server, a receiver 1116 adapted for receiving, as response, an access and refresh token for said service providing said long-running operation, and a continuation module 1118 adapted for continuing said service providing said long-running operation using refresh tokens receivable from said authorization server by said service providing said long-running operation.

According to one aspect of the present invention, a computer-implemented method for a token-based authorization in a data processing environment may be provided. The data processing environment may at least comprise a user system executing a user agent, an application server executing an application and an authorization server. The user agent may be in communicative contact via a first network connection with the application and the application may be in communicative contact via a second network connection with the authorization server. The application may provide access to a service providing a long-running operation. At least the service providing the long-running operation may be identifiable by an identifier.

The method may comprise accessing the application via the user agent, sending an access token and a refresh token from the authorization server to the application after an authorization protocol has been finished successfully, and triggering an execution of the service providing the long-running operation by the application.

Thereby the triggering may comprise requesting a transferable refresh token by the application from the authorization server, receiving the transferable refresh token from the authorization server by the application, wherein the transferable refresh token comprises at least a refresh token and the identifier for the service which provides the long-running operation, and starting an execution of the service providing the long-running operation by passing the transferable refresh token together with the identifier from the application to the service providing the long-running operation. Furthermore the triggering may comprise passing the transferable refresh token together with the identifier of the service providing the long-running operation from the service providing the long-running operation to the authorization server, receiving, as response, an access and refresh token for the service providing the long-running operation, and continuing the service providing the long-running operation using refresh tokens receivable from the authorization server by the service providing the long-running operation.

According to another aspect of the present invention, a system for a token-based authorization in a data processing environment may be provided. Also, here, the data processing environment may comprise at least a user system executing a user agent, an application server executing an application and an authorization server. The user agent may be in communicative contact via a first network connection with the application and wherein the application may be in communicative contact via a second network connection with the authorization server. The application may provide access to a service providing a long-running operation, and at least the service providing the long-running operation may be identifiable by an identifier.

The security system may comprise an accessing unit adapted for accessing the application via the user agent, a sender adapted for sending an access token and a refresh token from the authorization server to the application after an authorization protocol has been finished successfully, and a triggering unit adapted for triggering an execution of the service providing the long-running operation by the application. The triggering unit may comprise a requesting module adapted for requesting a transferable refresh token by the application from the authorization server, a receiver adapted for receiving the transferable refresh token from the authorization server by the application, wherein the transferable refresh token may comprise at least a refresh token and the identifier for the service which provides the long-running operation and a start unit adapted for starting an execution of the service providing the long-running operation by passing the transferable refresh token together with the identifier from the application to the service providing the long-running operation.

The triggering unit may further comprise a passing module adapted for passing the transferable refresh token together with the identifier of the service providing the long-running operation from the service providing the long-running operation to the authorization server, a receiver adapted for receiving, as response, an access and refresh token for the service providing the long-running operation, and a continuation module adapted for continuing the service providing the long-running operation using refresh tokens receivable from the authorization server by the service providing the long-running operation.

The proposed computer-implemented method for a token-based authorization in a data processing environment may offer multiple advantages and technical effects. The problem of a split of user-oriented processes and long-running back-end services related to one of the user-oriented processes in a token-based authentication environment is solved. The same security standard may be implemented for the delegation as used for a regular access and theorization of services and resources.

A computing service on a server system, called by a user-oriented application on a client system, may underlie the same authorization level as the user-oriented application on the client system. After an initial setup process, the related back-end, long-running service will be authenticated by an exclusive access and refresh token. The process may be completely controlled by the user-oriented application but may not invoke any additional communication overhead between the client application and a back-end application delivering a service, e.g., a long-running, computer-intensive and complex data analysis.

The herein proposed concept does also not rely on unsecure cookies stored on one or another computing system, which may be freely accessible, and, thus, unsecure. Instead, the client application is—after an initial phase—freed from caring about an authentication of the back-end computing service until that back-end system may be able to deliver its results to the client application. Thus, the impact on the client application may be kept to a minimum. Additionally, also the impact on existing authorization concepts is minimally invasive, and, thus, it extends reliable and highly trusted authorization concepts elegantly.

Furthermore, the here proposed method may use the same endpoint, parameters, and invocation style (POST/token, request sends form data as body, response contains JSON (Java Script Object Notation)) like all other OAuth2.0 interactions. Thus, good compatibility is given. The learning effort for user, programmers and/or adopters of that new token method remains low, and it enables new areas for OAuth2, e.g. banking applications that normally may move the "real" processing into a nightly batch run which cannot adopt pure OAuth2.0 for the nightly batch run because the tokens would be expired. The proposed concept allows instead to extend OAuth2.0 to also those scenarios and may allow to apply OAuth2.0 to all steps in that scenario.

In the following, additional embodiments of the inventive concept—applicable to the related method as well as the related security system—will be described.

According to one embodiment of the method, the transferable refresh token may further comprise an expiry time. This may be a fixed date/time combination, total number of time units from the initiation of the token, a preset number of seconds from the initiation of the token or, similar. This will limit the validity time of the transferable refresh token. After this time, the token is no longer usable for an application or service.

According to another embodiment of the method, the accessing the application via the user agent may also comprise using an authorization protocol between the application, the user agent and the authorization server, wherein the accessing is authorized by exchanging authentication credentials between the application and the authorization server. As a selected authorization protocol, also already known protocols, or elements thereof, may be used, and may be integrated into the proposed concept. One of those potential authorization protocols is the open standard OAuth 2.0 protocol.

In additional embodiments of the method, a request related to the requesting the transferable refresh token may also comprise the refresh token together with the identifier of the service which executes the long-running operation. This way, the secure request regarding the transferable refresh token may be guaranteed. Further, requesting the transferable refresh token and the above-mentioned accessing the application via the user agent may be combined into one request, e.g., one API (application programming interface) call.

According to another embodiment of the method, the authorization server may be adapted for providing authorization services according to the OAuth 2.0 protocol. This is in line with the above-mentioned potential user edge of open standard security protocols. Of course, also other protocol types may be used in its completeness or in parts as part of the here proposed concept.

According to another embodiment of the method, the long-running operation is selected out of the group comprising a data analytic process, a data transfer process, a backup process, a data reorganization, and a process of a neural network. The aforementioned different application areas may serve as examples also for other computing tasks, having a comparably long execution time.

According to one further embodiment of the method, the long-running operation may run longer than an access token expiration time of the application. This may represent an environment in which the proposed concept may display its full set of advantages.

According to yet another embodiment of the method, the transferable refresh token may comprise at least a user identifier—in particular, a user agent identifier actually representing the user—one or more scopes (i.e., "allowed actions") an expiry time of the transferable refresh token, an identifier of the service providing the long-running operation and an expiry time of the service providing the long-running operation. Additional parameters components may be added to the transferable refresh token in order to fit into the architecture of an underlying security protocol. The expiry time of the transferable refresh token may ensure that the newly issued transferable refresh token may be used with a predetermined time after it has been received. This expiration time may have to be differentiated from the exploration time required and related to the long-running operation. It may also be noted that the setting of scopes has already been described in the context of the OAuth 2.0 protocol.

According to a further embodiment of the method, the service providing the long-running operation may request a second transferable refresh token to be provided to a second service providing a second long-running operation. This may allow a chaining of long running services or applications. This may represent a typical set up in service-oriented architectures, in which, e.g., a plurality of long-running operations run in parallel, e.g., to perform a complex analysis in a big data environment.

According to one optional embodiment of the method, the requesting a transferable refresh token by the application from the authorization server may only be performed after a confirmation by the user agent. For this, a user interaction may be required or may be recommendable. Thus, the user may control the way his secure access is transferred to the third entity, namely the service providing the long-running operation. Thus, the end-user may stay in control of the complete process and also the delegation of access rights.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

Embodiments of the invention may be implemented together with virtually any type of computer, regardless of the platform being suitable for storing and/or executing program code. FIG. 12 shows, as an example, a computing system 1200 suitable for executing program code related to the proposed method. One or more of the servers used for executing the proposed method may have the form of the computing system 1200.

The computing system 1200 is only one example of a suitable computer system and is not intended to suggest any limitation as to the scope of use or functionality of embodiments of the invention described herein, regardless, whether the computing system 1200 is capable of being implemented and/or performing any of the functionality set forth hereinabove. In the computing system 1200, there are components, which are operational with numerous other general-purpose or special-purpose computing system environments or configurations. Examples of well-known computing systems, environments, and/or configurations that may be suitable for use with computing system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing system/server 1200 may be described in the general context of computer system-executable instructions, such as program modules, being executed by a computing system 1200. Generally, program modules may include routines, programs, objects, components, logic, data structures, and so on that perform particular tasks or implement particular abstract data types. Computing system/server 1200 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computing system/server 1200 is shown in the form of a general-purpose computing device. The components of computing system/server 1200 may include, but are not limited to, one or more processors or processing units 1202, a system memory 1204, and a bus 1206 that couple various system components including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computing system/server 1200 typically includes a variety of computer system readable media. Such media may be any available media that is accessible by computing system/server 1200, and it includes both, volatile and non-volatile media, removable and non-removable media.

The system memory 1204 may include computer system readable media in the form of volatile memory, such as random-access memory (RAM) 1208 and/or cache memory 1210. Computing system/server 1200 may further include other removable/non-removable, volatile/non-volatile computer system storage media. By way of example only, a storage system 1212 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments of the invention.

The program/utility, having a set (at least one) of program modules 1216, may be stored in memory 1204 by way of example, and not limiting, as well as an operating system, one or more application programs, other program modules, and program data. of the operating systems, one or more application programs, other program modules, and program data or some combination thereof, may include an implementation of a networking environment. Program modules 1216 generally carry out the functions and/or methodologies of embodiments of the invention, as described herein.

The computing system/server 1200 may also communicate with one or more external devices 1218 such as a keyboard, a pointing device, a display 1220, etc.; one or more devices that enable a user to interact with computing system/server 1200; and/or any devices (e.g., network card, modem, etc.) that enable computing system/server 1200 to communicate with one or more other computing devices. Such communication can occur via Input/output (I/O) interfaces 1214. Still yet, computing system/server 1200 may communicate with one or more networks such as a local area network (LAN), a general wide area network (WAN), and/or a public network (e.g., the Internet) via network adapter 1222. As depicted, network adapter 1222 may communicate with the other components of computing system/server 1200 via bus 1206. It should be understood that, although not shown, other hardware and/or software components could be used in conjunction with computing system/server 1200. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for a token-based authorization, the method comprising:
    determining, by one or more processors, that an authorization protocol utilized by an application successfully executes, wherein the successful execution of the authorization protocol further comprises:
        obtaining by one or more processors, a first access token and a corresponding first refresh token from an authorization server to the application, wherein the first access token and the corresponding first refresh token differ from tokens utilized by one or more services and respective long-running operations to access a resource server; and
        obtaining, by one or more processors, a transferable access token corresponding to a service providing a long-running operation; and
    triggering, by one or more processors, an execution of the service providing the respective long-running operation utilized by the application, utilizing the transferable access token.

2. The method of claim 1, wherein obtaining the transferable access token corresponding to the service providing the respective long-running operation further comprises:
    sending, by one or more processors, a request to create the transferable refresh token corresponding to at least a respective service, to the authorization server; and
    responsive to sending the request to create the transferable refresh token corresponding to at least the respective service, receiving, by one or more processors, at the application, the transferable refresh token corresponding to at least the respective service created by the authorization server, wherein the transferable refresh token comprises at least a second refresh token and an identifier corresponding to the respective service that provides the long-running operation.

3. The method of claim 1, wherein triggering the execution of the service providing the respective long-running operation utilized by the application further comprises:
- passing, by one or more processors, to the service, the transferable refresh token together with the identifier corresponding to the service providing the respective long-running operation for subsequent validation by the authorization server.

4. The method of claim 1, wherein the transferable refresh token includes an expiry time of the corresponding first refresh token and a separate expiry time, different from the expiry time of the corresponding first refresh token.

5. The method of claim 2, wherein the request to create the transferable refresh token further includes the corresponding first refresh token and the identifier corresponding to the respective of the service that executes the long-running operation.

6. The method of claim 1, wherein the long-running operation runs longer than the first access token expiration time of the application.

7. The method of claim 1:
- wherein the long-running operation an operation selected from the group consisting of a data analytic process, a data transfer process, a backup process, a data reorganization, and a process of a neural network; and
- wherein the authorization server is a server that provides authorization services according to OAuth 2.0 protocol.

8. The method of claim 2, wherein the transferable refresh token further includes a user identifier and an expiry time of the respective service providing the long-running operation.

9. A computer program product for a token-based authorization, the computer program product comprising:
- one or more computer readable storage media and program instructions stored on the one or more computer readable storage media, the program instructions comprising:
  - program instructions to determine that an authorization protocol utilized by an application successfully executes, wherein the successful execution of the authorization protocol further comprises:
    - program instructions to obtain a first access token and a corresponding first refresh token from an authorization server to the application, wherein the first access token and the corresponding first refresh token differ from tokens utilized by one or more services and respective long-running operations to access a resource server; and
    - program instructions to obtain a transferable access token corresponding to a service providing a long-running operation; and
  - program instructions to trigger an execution of the service providing the respective long-running operation utilized by the application, utilizing the transferable access token.

10. The computer program product of claim 9, wherein the program instructions to obtain the transferable access token corresponding to the service providing the respective long-running operation, further comprise program instructions to:
- send a request to create the transferable refresh token corresponding to at least a respective service, to the authorization server; and
- receive the transferable refresh token from the authorization server by the application, wherein the transferable refresh token comprises at least a refresh token and the identifier for the service that provides the long-running operation.

11. The computer program product of claim 9, wherein the program instructions to trigger the execution of the service providing the respective long-running operation utilized by the application, further comprise program instructions to:
- pass, to the service, the transferable refresh token together with the identifier corresponding to the service providing the respective long-running operation from the for subsequent validation by to the authorization server.

12. The computer program product of claim 9, wherein the long-running operation runs longer than the first access token expiration time of the application.

13. A computer system for a token-based authorization, the computer system comprising:
- one or more computer processors;
- one or more computer readable storage media; and
- program instructions stored on the computer readable storage media for execution by at least one of the one or more processors, the program instructions comprising:
  - program instructions to determine that an authorization protocol utilized by an application successfully executes, wherein the successful execution of the authorization protocol further comprises:
    - program instructions obtain a first access token and a corresponding first refresh token from an authorization server to the application, wherein the first access token and the corresponding first refresh token differ from tokens utilized by one or more services and respective long-running operations to access a resource server; and
    - program instructions to obtain a transferable access token corresponding to a service providing a long-running operation; and
  - program instructions to trigger an execution of the service providing the respective long-running operation utilized by the application, utilizing the transferable access token.

14. The computer system of claim 13, wherein the program instructions to obtain the transferable access token corresponding to the service providing the respective long-running operation, further comprise program instructions to:
- send a request to create the transferable refresh token corresponding to at least a respective service, to the authorization server; and
- receive the transferable refresh token from the authorization server by the application, wherein the transferable refresh token comprises at least a refresh token and the identifier for the service that provides the long-running operation.

15. The computer system of claim 13, wherein the program instructions to trigger the execution of the service providing the respective long-running operation utilized by the application, further comprise program instructions to:
- pass, to the service, the transferable refresh token together with the identifier corresponding to the service providing the respective long-running operation from the for subsequent validation by to the authorization server.

16. The computer system of claim 13, wherein the long-running operation runs longer than the first access token expiration time of the application.

17. The method of claim 1, wherein each transferable access token is exclusively bound to a respective service via at least an identifier corresponding to the service that provides the respective long-running operation and an identifier corresponding to the application that utilizes the service.

18. The method of claim 1, wherein triggering the execution of the service providing the respective long-running operation utilized by the application frees the application from subsequent authorization operations related to the service until a result is obtained from the service performing the respective long-running operation.

19. The computer program product of claim 9, wherein each transferable access token is exclusively bound to a respective service via at least an identifier corresponding to the service that provides the respective long-running operation and an identifier corresponding to the application that utilizes the service.

\* \* \* \* \*